US007673912B2

(12) United States Patent
Breininger

(10) Patent No.: US 7,673,912 B2
(45) Date of Patent: Mar. 9, 2010

(54) EXTENDABLE CARGO RETRIEVER

(76) Inventor: Chris C. Breininger, 6638 Phillips Rd., Germansville, PA (US) 18053

( * ) Notice: Subject to any disclaimer, the term of this patent is extended or adjusted under 35 U.S.C. 154(b) by 0 days.

(21) Appl. No.: 11/986,957

(22) Filed: Nov. 27, 2007

(65) Prior Publication Data

US 2008/0122232 A1 May 29, 2008

Related U.S. Application Data

(60) Provisional application No. 60/867,224, filed on Nov. 27, 2006.

(51) Int. Cl.
*B25J 1/04* (2006.01)

(52) U.S. Cl. ........................................ 294/19.1; 294/26

(58) Field of Classification Search .................. 294/26, 294/19.1; D8/14
See application file for complete search history.

(56) References Cited

U.S. PATENT DOCUMENTS 4,624,494 A * 11/1986 Huppert ....................... 294/26
5,487,576 A * 1/1996 DuVivier .................. 294/19.1
5,716,064 A * 2/1998 Frerichs .................. 280/164.1
6,450,557 B1 * 9/2002 Martinez .................. 294/19.1
6,607,338 B2 8/2003 Lemke
7,090,217 B1 * 8/2006 Siron ..................... 273/148 R
2003/0051305 A1 * 3/2003 Hewlett ..................... 294/19.1
2006/0249963 A1 11/2006 Rousey et al.
2007/0018467 A1 * 1/2007 Schwartz .................. 294/19.1

* cited by examiner

*Primary Examiner*—Paul T Chin
(74) *Attorney, Agent, or Firm*—James Ray & Assoc.

(57) ABSTRACT

A truck cargo-moving tool combines an elongated extendable arm having at least two telescopically connected rigid coaxial tubes and a substantially rigid head having two faces, at least one substantially flat edge, a blunt heel, and an arcuate toe curved toward the axis of the extendable arm. The extendable arm is attached generally perpendicular to the head proximal the heel in order to form a tool useful for moving items resting on a long horizontal surface. There is at least one locking mechanism attached or built into the extendable arm for securing the coaxial tubes at a desired operating arm length.

6 Claims, 4 Drawing Sheets

EXTENDABLE CARGO RETRIEVER

CROSS REFERENCE TO RELATED APPLICATION

This patent application is related to and claims priority from U.S. Provisional Patent Application Ser. No. 60/867,224 filed Nov. 27, 2006.

FIELD OF THE INVENTION

The present invention relates, in general, to devices for storing and moving cargo and, more particularly, this invention relates to a tool to facilitate moving of items in the bed of a pick-up truck.

BACKGROUND OF THE INVENTION

Prior to the conception and development of the present invention, pick-up truck users have had to endure cumbersome ways to move items in the bed of the truck from near the cab to the tailgate. One common way is to climb inside and walk to the item and then push or pull it. Another is to stand on something outside the bed and reach over the side wall to reach the item. The task becomes even harder or more time consuming if the bed is extra long or has a tonneau cover. Some, such as Frerichs in U.S. Pat. No. 5,716,064, have devised ways to make access easier, in Frerichs' case a pull-out step.

In U.S. Pat. No. 6,607,338, Lemke discloses a multi-purpose adjustable pole for use in pick-up trucks that serves as a hanging or restraint bar across the width of the bed. Also, it can be used to move cargo around in the bed of the truck. However, the many parts and features of the Lemke design are likely to make it costly for someone who wants to just pull or push items around the bed. Also, the cargo arm in Lemke is slanted away from the user and has no hook near the tip, thus making it prone to slipping off many items which the user wants to pull in his direction.

In U.S. Pat. Application Publication 2006/0249963, a pole-mounted load handling apparatus with a claw-like head is disclosed. It is not telescopically extendable, and a primary feature is a built in adjustable loop for grabbing certain types of items. This makes the device somewhat complex to manufacture and consequently more expensive than some pick-up owners are willing to pay.

SUMMARY OF THE INVENTION

The present invention provides a truck cargo-moving tool which combines an elongated extendable arm having at least two telescopically connected rigid coaxial tubes with a substantially rigid head having two faces, at least one substantially flat edge, a blunt heel, and an arcuate toe curved toward the axis of the extendable arm. The extendable arm is attached generally perpendicular to the head proximal the heel in order to form a tool useful for moving items resting on a long horizontal surface. There is a locking mechanism attached or built into the extendable arm for securing the coaxial tubes at a desired operating arm length. In the preferred embodiment, there is a handle grip at the distal end of the extendable arm.

OBJECTS OF THE INVENTION

It is, therefore, one of the primary objects of the present invention to provide an inexpensive extendable device for retrieving items from the bed of a pick-up truck.

Another object of the present invention is to provide a device that will facilitate positioning of items in the bed of a pick-up truck even if it is covered.

Still another object of the present invention is to provide a stowable, lightweight tool that can hook onto items for removing them from the back of a pick-up truck without entering the bed.

Yet another object of the present invention is to provide a cargo-moving tool readily accessible and usable from the tailgate of a pick-up truck.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

DETAILED DESCRIPTION OF A PRESENTLY PREFERRED EMBODIMENT OF THE INVENTION

Figure 1:
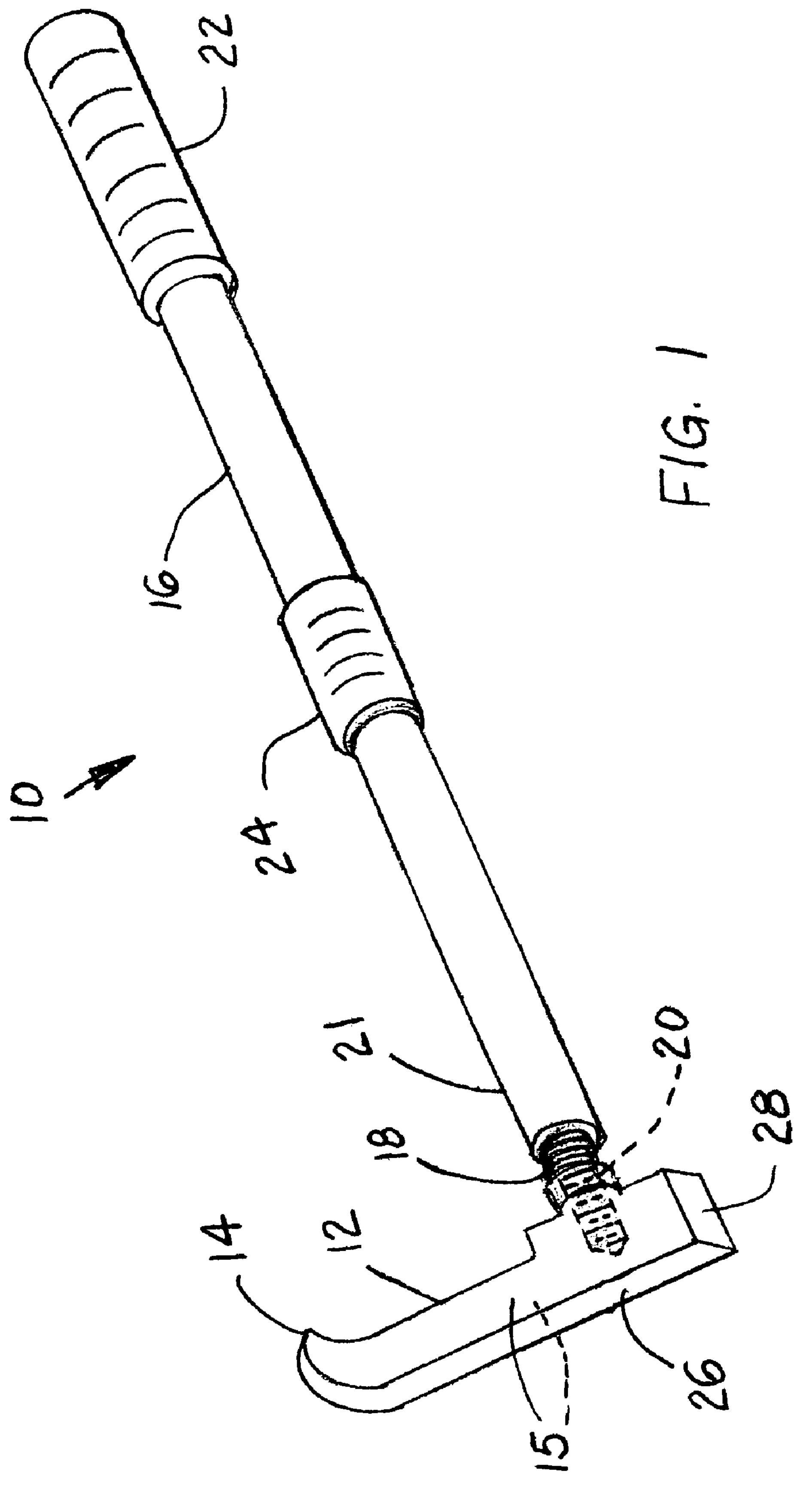
FIG. 1 is a perspective view of the truck-bed retrieving tool.

Prior to proceeding to the more detailed description of the present invention it should be noted that, for the sake of clarity and understanding, identical components which have identical functions have been identified with identical reference numerals throughout the several views illustrated in the drawing figures.

Referring initially to FIG. 1, a perspective view of the cargo-moving tool 10 is provided. The telescopically extendable handle would be one of the many commercially available, which typically consists of an outer tube 16 which releases or tightens the inner tube 18 by twisting the two tubes in opposite directions, or rotating a twist-lock sleeve 24 at the distal end of outer tube 16. Those of the ShurLine brand would serve as a suitable example. Preferably, the outer tube 16 has a grip 22 at the proximal end typically grasped by the user. Other locking and release mechanism are also acceptable, such as a thumb screw, or a cam lever. The threaded end 18 of inner tube 21 screws into or is permanently secured to a special head 12 at internally threaded location 20 close to the heel 28, which is a blunt rectangular end opposite the toe 14. The head can be fabricated of metal or plastic, but is substantially rigid and has a toe 14 curved toward the handle 16. Also, the head 12 has sufficient thickness separating the two parallel opposing planar faces 15 to form a flat edge 26 which is adjacent both planar faces 15 along the entire flat edge 26 in order that it can be used for pushing items further into the truck bed without damaging them, but less than one-inch so as to fit easily under a tool box handle and the like. As shown, the surface of the blunt heel 28 shares a width with that of the planar faces 15 and a height substantially the same as the thickness of the flat edge 26.

Figure 2:
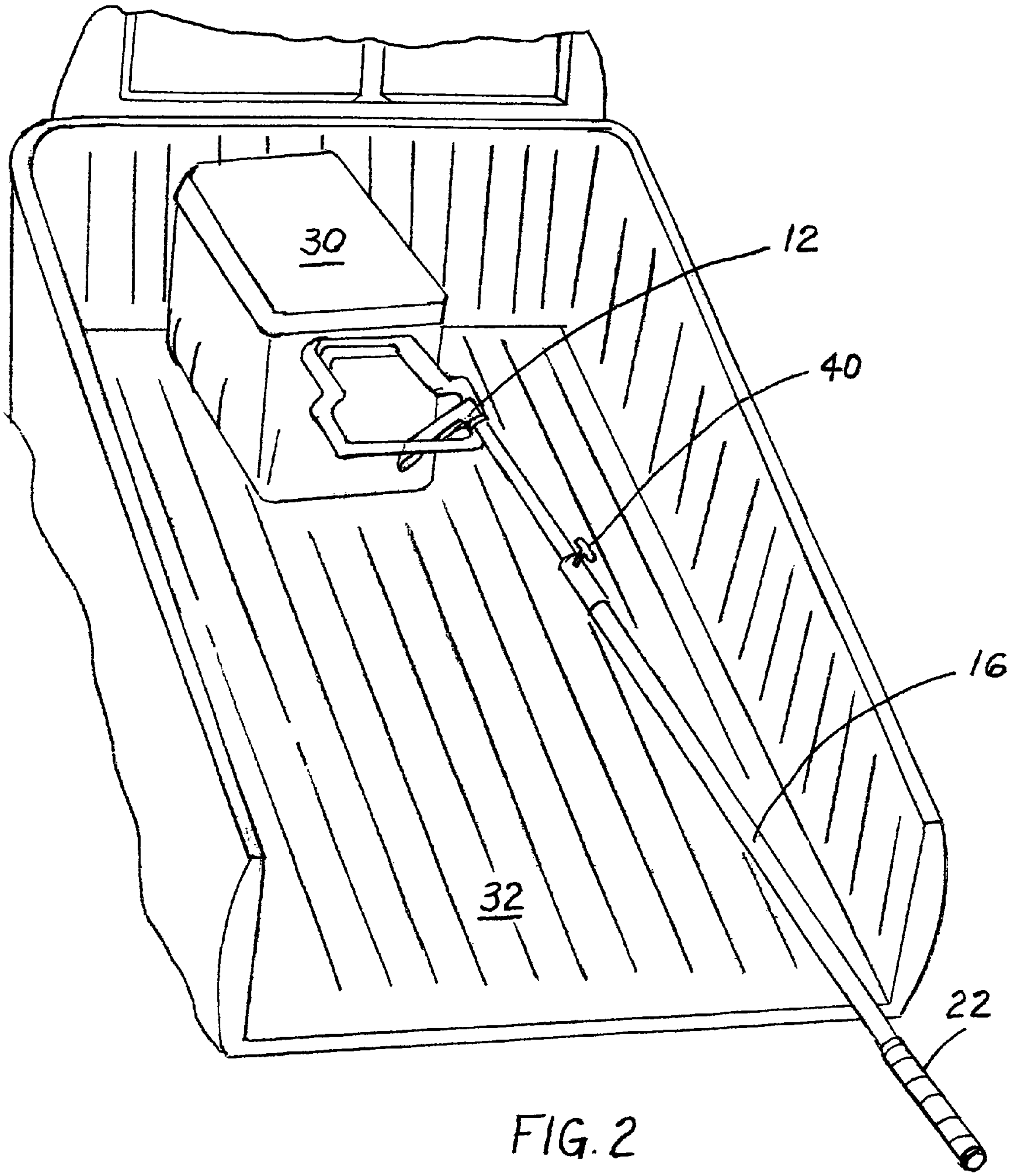
FIG. 2 is a perspective view depicting the retrieving device grasping an item in a truck bed.

FIG. 2 illustrates a use of the present invention in a perspective view. An item 30 with a handle is resting in a truck bed 32 near the cab end. With the hook head 12, the user at the proximal end of handle 16 and near the tailgate is able to grasp and pull item 30 toward the tailgate. A thumb screw 40 is shown as one of the alternative locking means for holding the two telescoping sections of pole 16 and 21 at the desired overall length.

Figure 3:
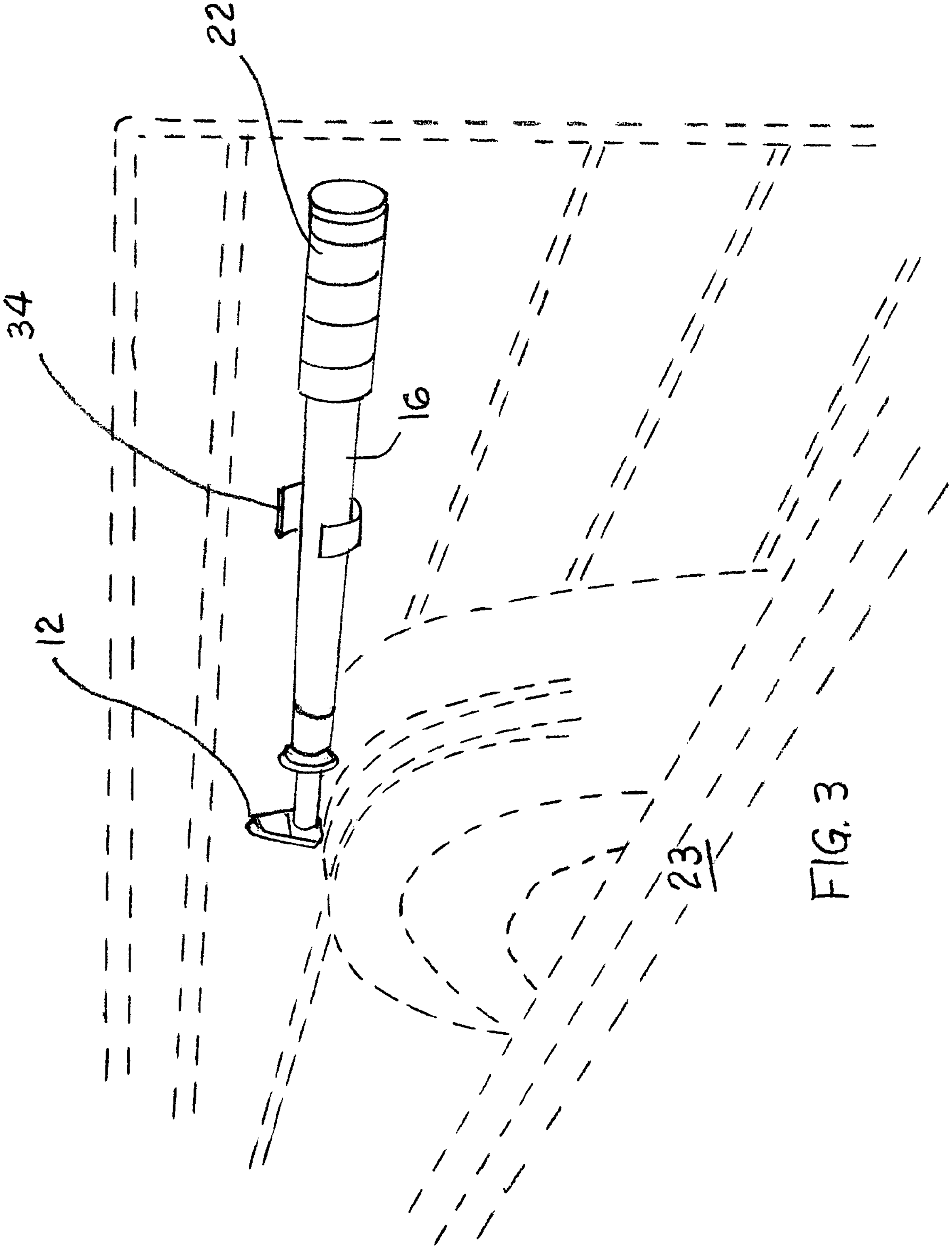
FIG. 3 is a perspective view of the cargo retriever in a stowed position.
Figure 4:
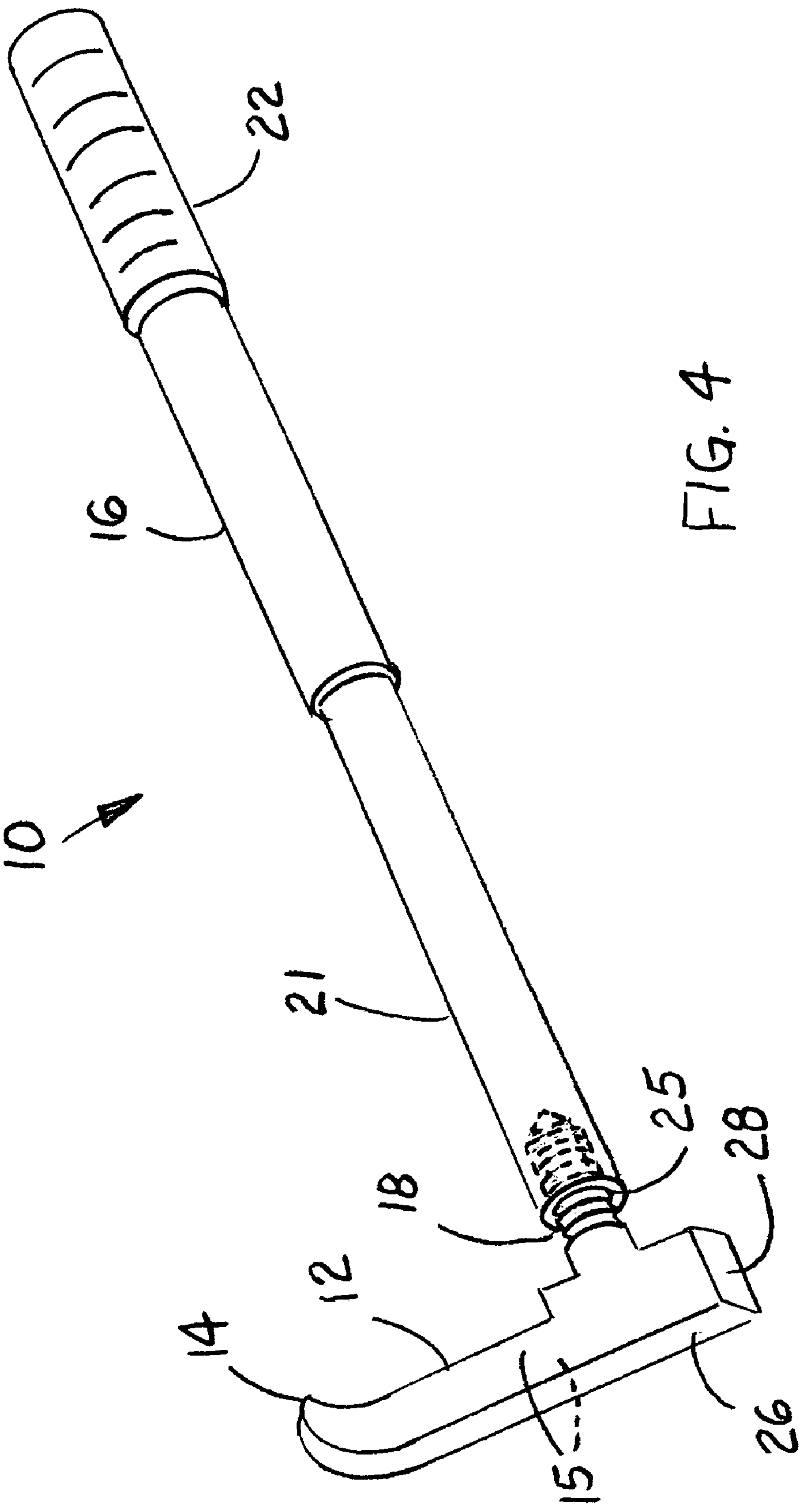
FIG. 4 provides a perspective view of an alternative embodiment of the present invention.

FIG. 3 depicts how the retrieving tool 16 might be stowed in the bed area 32 of a pickup truck. At least one flexible jaw clamp 34 is attached to the wall of the rear section 36. The same, it should be obvious that various other adaptations and modifications can be envisioned by those persons skilled in such art without departing from either the spirit of the invention or the scope of the appended claims.

I claim:

1. A truck cargo-moving tool comprising:

an elongated extendable arm having a proximal end and a distal end and having at least two telescopically connected substantially rigid coaxial tubes with diameters in a predetermined range, wherein said proximal end has a diameter greater than said distal end;

a substantially rigid head having two faces, at least one substantially flat edge less than one-inch wide, a blunt heel, and an arcuate toe having a tangent line forming an angle less than 80 degrees to axis of said extendable rod, said blunt heel having a substantially rectangular surface with a width substantially equal to that of said two faces, and said two faces are adjacent along the entire said flat edge;

a connection means engageable with said distal end of said elongated extendable arm and substantially perpendicular to said head proximal said heel for forming said truck cargo tool for pushing and pulling items resting on a horizontal surface; and at least one locking means in contact with surfaces of said at least two coaxial tubes for securing said coaxial tubes at a selectable overall length within a predetermined range.

2. A truck cargo-moving tool, according to claim 1, wherein a handle is attached to said proximal end of said extendable arm.

3. A truck cargo-moving tool, according to claim 1, wherein said connection means for attaching said extendable arm to said head is a threaded joint.

4. A truck cargo-moving tool, according to claim 1, wherein said locking means for securing said coaxial tubes at said desired overall length is a twist lock sleeve.

5. A truck cargo-moving tool, according to claim 1, wherein said range of said predetermined diameters is between about one-half and three inches.

6. A truck cargo-moving tool, according to claim 1, wherein said predetermined range of said selectable overall length is between about three and ten feet.

* * * * *